March 18, 1941.  H. LUTZ  2,235,228
MOTOR TRACTOR WITH GAS PRODUCER MOUNTED THEREON
Filed May 24, 1938  2 Sheets-Sheet 1
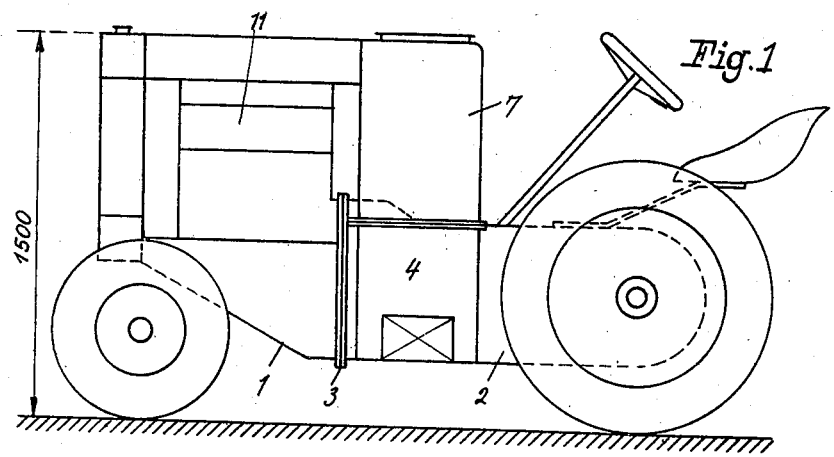
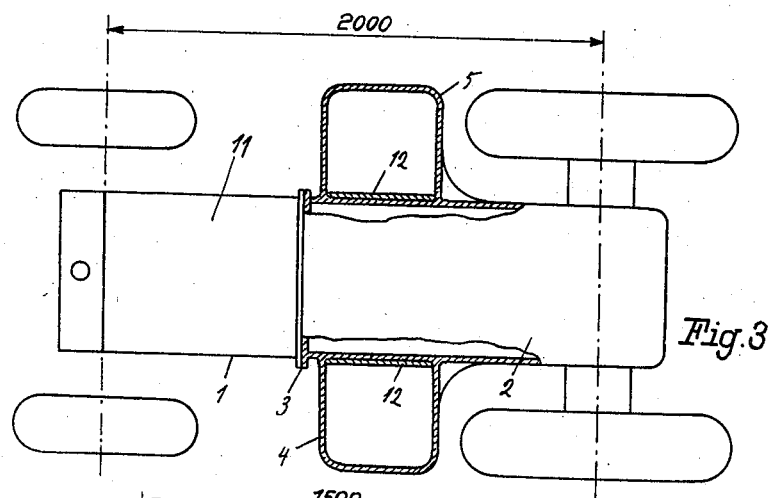
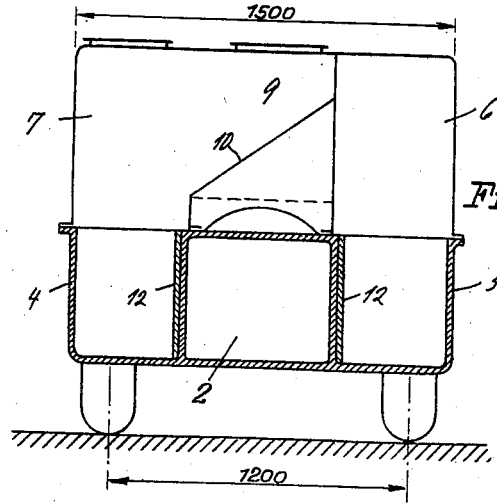
Inventor:
Hans Lutz March 18, 1941.  H. LUTZ  2,235,228
MOTOR TRACTOR WITH GAS PRODUCER MOUNTED THEREON
Filed May 24, 1938  2 Sheets-Sheet 2

Inventor:
Hans Lutz,
by Ferd. Murch
Attorney

Patented Mar. 18, 1941

2,235,228

UNITED STATES PATENT OFFICE 2,235,228

MOTOR TRACTOR WITH GAS PRODUCER MOUNTED THEREON

Hans Lutz, Berlin-Charlottenburg, Germany

Application May 24, 1938, Serial No. 209,755
In Germany May 27, 1937

8 Claims. (Cl. 180—1)

This invention relates to a motor tractor with gas producer mounted thereon. It is known on Diesel tractors and the like to change over the engine to gas fuel and to subsequently fit a gas producer with purifying apparatus on the tractor between the front and rear wheels. Such plants, owing to the great overall height of the gas producer, adapt themselves very badly to the tractor, obstruct the vision of the driver and are difficult to accommodate without considerable displacement of the centre of gravity, quite apart from the fact that the fitting of a gas producer on a tractor demands an excessive amount of technical knowledge from the fitter. Furthermore, the usual gas producers are made of relatively thin sheet metal as compared with the heavy castings of the tractor, with the result that, as the tractor body transmits every impact and vibration to the gas producer, the elements of the gas producer and of the purifying apparatus and also the pipe conduits very soon become defective. It is practically impossible to avoid these impacts and vibrations by suitable arrangement as the centre of gravity of the gas producer plants lies too high.

To enable gas fueling by means of gas producers to be used at all in tractors, it is proposed according to the invention that the lower part of the gas producer and perhaps also the lower part of the gas purifier and cooler be made as a single casting with the tractor body or flanged as separately cast parts on the cast tractor body by means of cast-on flanges. At the same time the lower part of the gas producer and if necessary also of the purifier are preferably arranged laterally between the front and rear wheels. The upper parts of the producer and purifier, as the lower parts are organically connected with the tractor body, may be made of thin sheet metal plates and flanged on the lower parts, when their height is preferably level with the upper edge of the engine casing, so that obstruction of clear vision is avoided. The space behind the engine casing and over the gear case, which was hitherto used for mounting the fuel tank, is utilized according to the invention for the same purpose in that the upper part of the producer has a lateral extension extending transversely behind the engine casing. As the extension has a sloping bottom to facilitate the slipping down of the fuel, an element of the purifying plant, a water tank or the like, may also be arranged under the slope.

When casting the lower parts of the gas producer and purifier the door apertures, gas passages, grate supports and also the fire cage may be wholly or partly taken into consideration, whereby the cost of production can be reduced.

An embodiment of the invention is illustrated by way of example in the accompanying drawings, in which:—

Fig. 1 shows a motor tractor with gas producer in side elevation,

Fig. 2 is a cross section through the tractor body and gas producer, the lower parts of the gas producer and of the purifier being in one piece.

Fig. 3 is a plan view of the tractor with part sections through the lower part of the gas producer and purifier.

Figure 4:
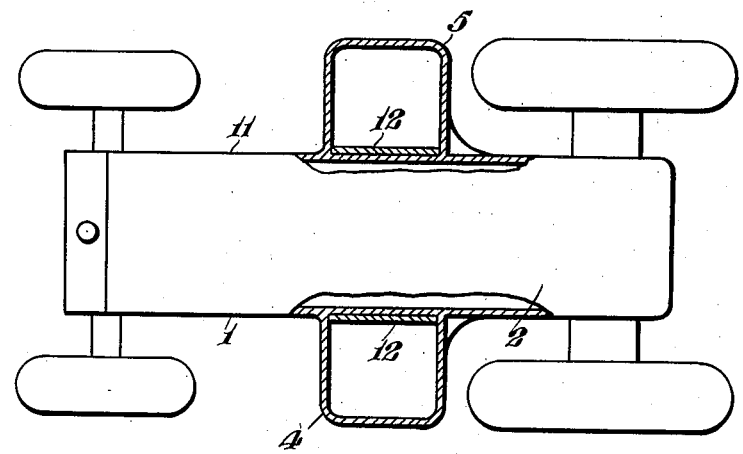
Figure 4 is a top plan view partly broken away and shown in section, of another form of the invention showing the engine block, gear block, gas producer and purifier cast in one piece.

The tractor body which comprises the engine block 1, the gear case 2 and the rear axle funnel, is generally subdivided by a main flange 3. According to the drawings the lower part 4 of a gas producer and the lower part 5 of a purifier 6 are cast in one piece with the gear case 2. All parts of the tractor may also be included in a single large casting and the usual flange 3 omitted. An upper part 7 of the gas producer serving as fuel tank and made of thin sheet metal extends from the lower part 4 of the gas producer which contains chiefly the glowing zone. This upper part 7 is flanged to the lower part 4 and has behind the tractor engine 11 above the gear case 2 a transverse extension 9 with a sloping bottom 10 which is utilized to full advantage for accommodating fuel. The space under the extension 9 may also serve for accommodating a water tank, a purifier or the like. The upper part 6 of the purifier may be flanged on to the cast lower part 5.

The upper edges of the gas producer, engine casing and purifier lie in the same horizontal plane so that the vision of the driver is not obstructed. To prevent the oil contained in the gear case 2 from being influenced by the gas producer 4, 7, 9 or by the purifier 5, 6, thick heat insulating layers 12 are provided or the lower part 4 of the gas producer, the lower part 5 of the purifier and the gear case 2 are additionally equipped with heat radiating ribs, not shown in the drawings.

The lower parts 4 and 5 of the gas producer and purifier respectively may either be cast or flanged on the gear case 2 or on the gear case and on the engine block 1, according to how the main flange 3 is situated between the front- and rear-wheel axles.

As stated, all parts of the tractor may be included in a single large casting. As shown in Figure 4, the gear case 2, the engine block 1, the lower part of the gas producer 4 and the lower part of the purifier 5 form one continuous cast body.

Figure 5:
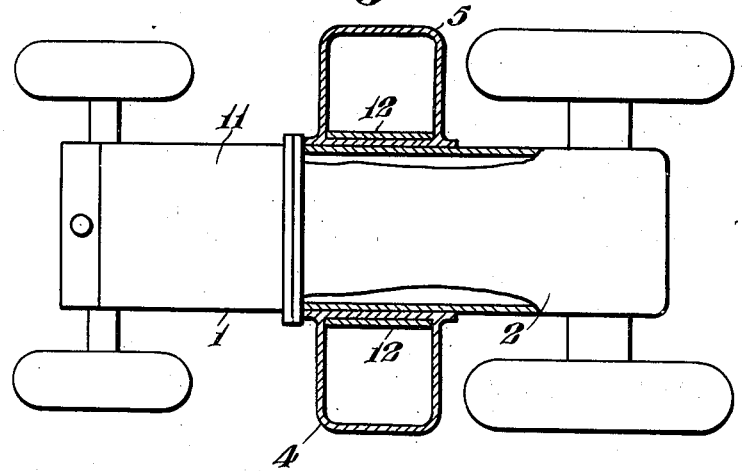
Figure 5 is a top plan view partly broken away and shown in section, the engine block and gear block being formed of two flanged sections connected together, with the gas producer and purifier having a flange connection with the gear block.

In Figure 5, the engine block 1 and the gear block 2 are formed as separate castings having a flange connection therebetween while the gas producer 4 and the purifier 5 have their lower parts formed as separate castings with flange connections for attaching the same to the gear block.

The main advantage of the construction according to the invention is, that the gas producer and purifier are divided up into an absolutely rigid lower part and lighter upper parts and that the rigid parts are organically connected with the rigid tractor body.

I claim:

1. A motor tractor with gas producer, comprising in combination a cast tractor body, and a gas producer having a cast lower part rigidly fixed on a fitting surface at one of the sides of the tractor body by means of cast-on flanges, and an upper part serving as fuel tank flanged on the said cast lower part.

2. A tractor as specified in claim 1, the gas producer arranged on one of the longitudinal sides of the tractor body, and a gas purifier arranged on the other longitudinal side of the tractor opposite said gas producer.

3. In a tractor as specified in claim 1, an engine housing on the tractor body, a gas purifier having a cast lower part rigidly fixed on the tractor body, a sheet metal upper part of said gas purifier, a sheet metal upper part on the gas producer, the upper sides of the upper parts of the purifier, producer and engine housing being in the same horizontal plane.

4. In a tractor as specified in claim 1, an engine housing and a gear case on the tractor body, a gas purifier having a cast lower part on said tractor body, a sheet metal upper part of the gas producer and a sheet metal upper part of the gas purifier flanged on their cast lower parts, and a transverse extension at the upper end of the upper part of the gas producer extending into the space over said gear case behind said engine housing.

5. A motor tractor with a gas producer, comprising in combination, a cast tractor body and a gas producer having a cast lower part arranged at one of the sides of the tractor body and the cast lower part of the gas producer and the tractor body being cast in one piece and a fuel tank arranged over the cast lower part of the gas producer and having a flange connection therewith.

6. In a tractor as specified in claim 5, a gas purifier having a cast lower part arranged on the tractor body and cast integral with the motor body and having flanged lighter upper parts.

7. In a tractor as specified in claim 1, wherein there is a gas purifier having a cast lower part rigidly fixed on the other side of the tractor body and the cast lower parts of the gas producer and the gas purifier being arranged between the front and rear wheel axles of the tractor.

8. A motor tractor with a gas producer, comprising in combination, a cast tractor body, a gas producer and a gas purifier having cast lower parts associated with the cast tractor body, flanged lighter upper parts for the cast lower parts of the gas producer and gas purifier, said cast lower parts being fixed on fitting surfaces on the sides of the tractor body by means of cast-on flanges on said cast lower parts.

HANS LUTZ.